United States Patent [19]

Mukli et al.

[11] Patent Number: 4,638,396
[45] Date of Patent: Jan. 20, 1987

[54] INTRINSICALLY SAFE BATTERY CIRCUIT

[75] Inventors: Glenn A. Mukli, Aurora; Paul C. Frew; David R. Mills, both of Scarborough, all of Canada

[73] Assignee: Motorola, Inc., Schaumburg, Ill.

[21] Appl. No.: 687,666

[22] Filed: Dec. 31, 1984

[51] Int. Cl.[4] .............................................. H02H 9/02
[52] U.S. Cl. ........................................ 361/101; 361/93
[58] Field of Search .................. 361/91, 93, 100, 101; 307/131, 140; 323/275–277, 279

[56] References Cited

U.S. PATENT DOCUMENTS

| | | | |
|---|---|---|---|
| 3,445,751 | 5/1969 | Easter | 323/9 |
| 3,512,047 | 5/1967 | Garde | 317/33 |
| 3,517,264 | 6/1970 | Anderson, Jr. | 317/23 |
| 3,535,592 | 10/1970 | Roveti | 317/33 |
| 3,553,531 | 1/1971 | Rimondini | 317/23 |
| 3,579,089 | 5/1971 | Giess | 323/279 |
| 3,686,530 | 8/1972 | Bogut | 317/16 |
| 3,748,569 | 7/1973 | Frank et al. | 361/91 |
| 4,363,064 | 12/1982 | Billings et al. | 361/57 |
| 4,404,473 | 9/1983 | Fox | 361/93 |
| 4,438,473 | 3/1984 | Cawley et al. | 361/18 |

OTHER PUBLICATIONS

Motorola "MX" Current Limited Battery Schematic.

Primary Examiner—A. D. Pellinen
Assistant Examiner—Jeffery A. Gaffin
Attorney, Agent, or Firm—Douglas A. Boehm; Donald B. Southard

[57] ABSTRACT

An overload protection circuit is disclosed which limits the current supplied by a battery to a load. The circuit is particularly adapted for use in portable radio applications which must meet rigorous specifications of intrinsically safe equipment for use in hazardous environments. Load sensor 20 continuously monitors for the presence of load to enable power switch 16 via switch control 22. Current trip circuit 24 monitors the voltage developed across current sensor 18 to provide a disable signal to switch control 22 in the event of an overload condition. Current limit circuit 26 limits the drive signal to power switch 16. Voltage trip circuit 28 prevents overdissipation of the power switch device. Thus, intrinsically safe battery circuit 30 provides protection such that hazardous gases will not be ignited by sparks or thermal heating during overload conditions.

13 Claims, 2 Drawing Figures

INTRINSICALLY SAFE BATTERY CIRCUIT

BACKGROUND OF THE INVENTION

1. Field of the Invention

The present invention relates generally to overload protection circuits, but more particularly to a battery protection circuit for portable radios used in hazardous environments.

2. Description of the Prior Art

Overload protection devices, such as fuses, series current limiters, and electronic crowbar circuits, are well known and widely used in the art. Of these prior devices, few are applicable for use in hazardous environments--locations in which the atmosphere contains gas, vapor, or dust particles which could easily be ignited by sparks or thermal heating. A fuse, for example, poses a thermal ignition threat under overload conditions. Similarly, current limiting circuits generally allow a maximum load current to flow under fault conditions. Although the current shutback feature of a crowbar circuit is desirable, these devices exhibit a slow response time allowing the possibility that sparks will be produced.

Even fewer prior art overload protection circuits accommodate the specific problems of battery operated equipment such as portable two-way radios. Portable applications present the additional requirements of low power consumption during use; negligible power consumption when not in use; and minimal voltage drop across the battery protection circuit. Furthermore, portable applications introduce severe size and cost limitations such that the protection circuit can be built inside each individual battery housing.

Bogut, in U.S. Pat. No. 3,686,530, entitled "Current Limited Battery Pack," presents an example of a battery protection circuit incorporated into the battery housing. Bogut controls a series transistor or relay by sensing excessive current through a series resistor to fire a silicon-controlled rectifier (SCR). Unfortunately, equipment specifications for certain types of hazardous atmospheres require either continuous current limiting capability, or a faster response time than this technique is capable of producing. Furthermore, the Darlington transistor pair exhibits a substantial voltage drop.

A need, therefore, exists for an intrinsically safe battery protection circuit that meets the stringent specifications for use in explosive atmospheres while at the same time being compatible with the requirements of portable radio applications.

SUMMARY OF THE INVENTION

Accordingly, it is an object of the present invention to provide an intrinsically safe battery circuit for portable radio applications for use in hazardous atmosphere environments.

A more particular object of the present invention is to provide a battery protection circuit which exhibits negligible power consumption when not in use.

Another object of the present invention is to provide a battery protection circuit exhibiting minimized power consumption during use.

Still another object of this invention is to provide a battery protection circuit exhibiting low series voltage drop.

In practicing the invention, an overload protection circuit is provided for limiting the current supplied by the battery to a load. The circuit is particularly adapted for use in portable radio applications which must meet rigorous specifications of intrinsically safe equipment for use in hazardous environments. The protection circuitry includes: a load sensor circuit adapted to detect when the load is turned on which then powers up the remaining protection circuitry, thus presenting negligible current drain from the battery under no-load conditions; a current sensor/current trip/current limit mechanism which controls the amount of energy delivered to the load such that sparking or thermal heating is prevented; and a voltage trip circuit to detect when load current is below the current trip level under low battery voltage conditions, thus preventing overdissipation of the power switch device. Furthermore, the present invention provides a simple, inexpensive, compact circuit capable of being incorporated inside the battery housing to accommodate portable radio applications.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanyin drawings, in which:

DETAILED DESCRIPTION

Figure 1:
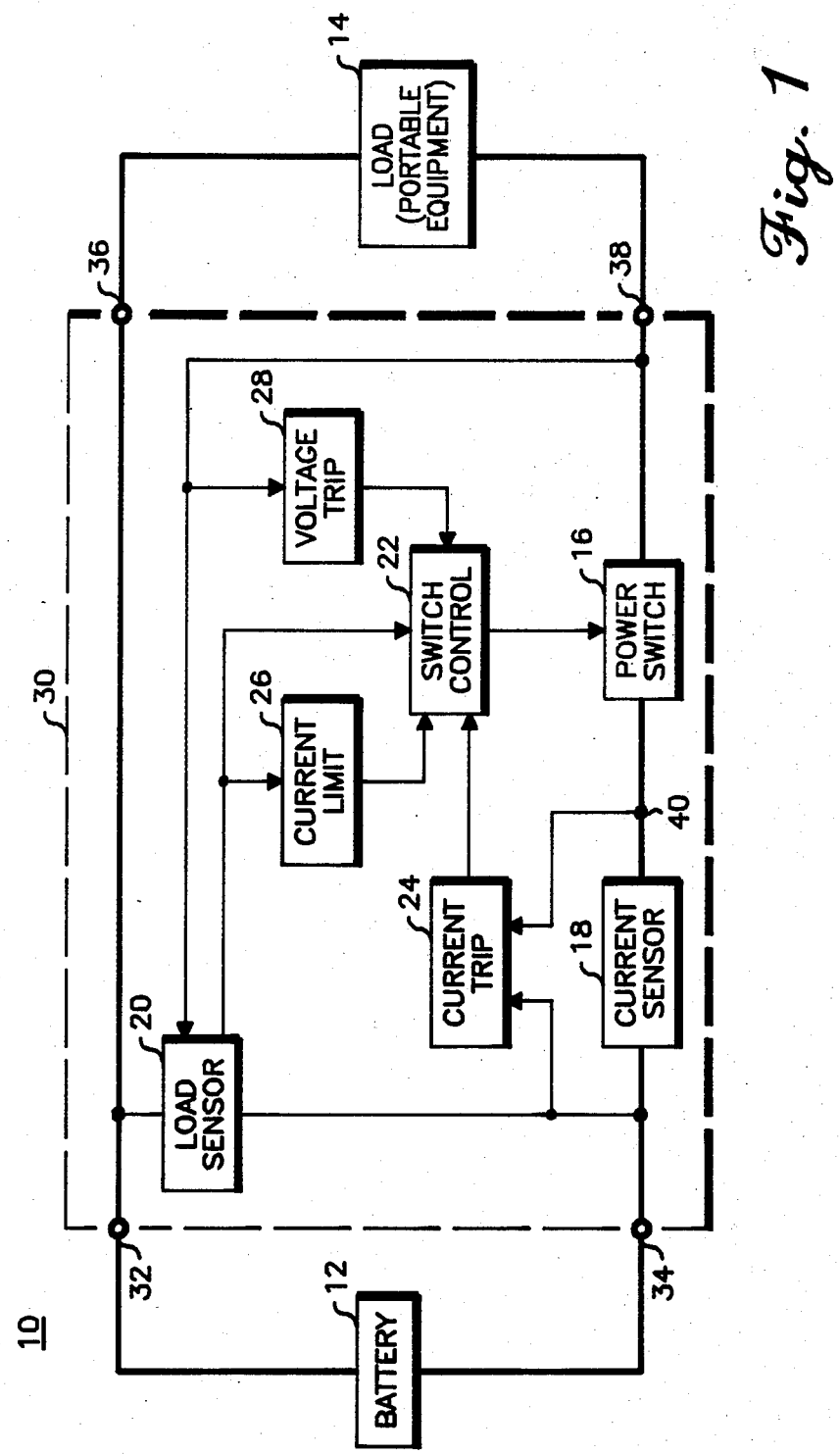
FIG. 1 is a block diagram illustrating the preferred embodiment of the intrinsically safe battery circuit of the present invention.

Referring now to the drawings, FIG. 1 is a block diagram of intrinsically safe battery circuit 30 having input terminals 32, 34 and output terminals 36, 38 such that circuit 30 is connected between battery 12 and load 14. The battery protection circuit serves to limit the amount of energy supplied to a load such that, in the event of a short circuit, sparking or thermal heating is prevented. Furthermore, intrinsically safe battery circuit 30 presents negligible current drain when the load is disconnected, such that the battery will not be discharged.

Load sensor 20, connected between input terminals 32 and 34, continuously monitors for the presence of a load at output terminals 36 and 38. When no load is present (i.e., when the portable radio is switched off), load sensor 20 signals switch control 22 to disable power switch 16 such that a continuous current path from battery 12 to load 14 does not exist. When load 14 is switched on, battery voltage from terminal 36 is applied through the load to terminal 38 and and to load sensor 20. Load sensor 20 then detects the presence of the load and signals switch control 22 to enable power switch 16. Thus, a return current path to the battery is provided from terminal 38 through power switch 16 through current sensor 18 to terminal 34.

The current control mechanism consists of current sensor 18, current trip circuit 24, and current limit circuit 26. Current trip circuit 24 monitors the voltage developed across current sensor 18 to provide a disable signal to switch control 22 in the event of an overload condition. Switch control 22 then disables power switch 16 such that no current is available to prevent thermal heating in the load. Power switch 16 will remain disabled until the load is completely removed. Current limit circuit 26 senses the amount of drive signal applied to switch control 22 from load sensor 20 to provide a maximum switch control signal level which limits the drive to power switch 16. As a result, current limit circuit 26 continuously limits the maximum load current through power switch 16.

Under low battery voltage conditions, the possibility exists that switch control 22 would not provide enough drive signal level to fully saturate power switch 16. If this occurs, during periods of high load current (but less than a predetermined current trip point), then power switch 16 could overdissipate. Voltage trip circuit 28 prevents this low voltage/high current condition from occurring. When power switch 16 comes out of saturation, terminal 38 voltage increases. Voltage trip circuit 28 continuously monitors terminal 38 to provide a voltage trip signal to switch control 22 to disable power switch 16 before overdissipation occurs. Power switch 16 remains disabled until the load is removed.

In review, intrinsically safe battery circuit 30 limits the amount of battery output current applied to a load such that hazardous gases will not be ignited by sparks or thermal heating during short circuit conditions. Load sensor 20 enables the remaining circuitry only in the presence of a load, providing the significant advantage of negligible battery drain under no-load conditions. Current sensor 18/current trip circuit 24/current limit circuit 26 provides a mechanism to prevent high currents from causing sparks or thermal heating. Voltage trip circuit 28 prevents overdissipation of power switch 16 under low battery voltage conditions.

Figure 2:
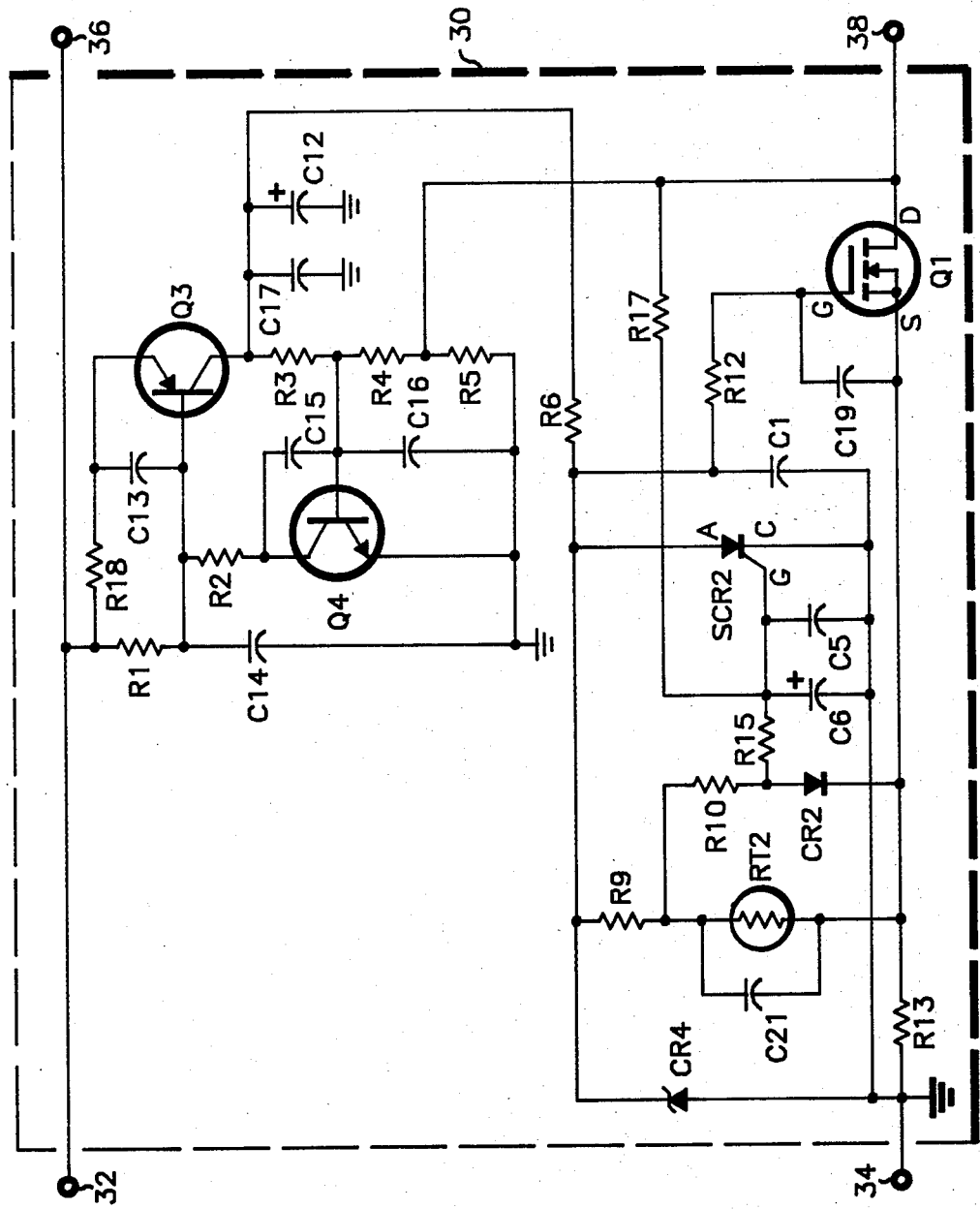
FIG. 2 is a schematic representation of the preferred embodiment of FIG. 1 illustrating the individual components of the battery protection circuit.

FIG. 2 illustrates the components of the preferred embodiment of intrinsically safe battery circuit 30. Positive battery voltage is applied to input terminal 32, and negative voltage is applied to input terminal 34 which is ground. Similarly, an external load is connected across output terminals 36 and 38. One important feature of the present invention is that load voltage is sensed at terminal 38, alleviating the requirement for an external voltage sensing terminal.

Load sensor 20 is comprised of PNP transistor Q3, NPN transistor Q4, and associated resistors and capacitors. This load sensor circuitry receives battery voltage from terminal 32 and ground at terminal 34. When the external load is disconnected, terminal 38 is at ground potential, and transistors Q3 and Q4 are cut off.

Power switch 16 is comprised of MOSFET transistor Q1 coupled in series between input terminal 34 and output terminal 38. This power switch device remains in a nonconductive state when no load is present. A MOSFET transistor has extremely high input impedance as compared to a bipolar transistor. The use of MOSFET transistor Q1 as power switch 16 permits the battery protection circuit to control high drain-source currents without requiring high gate currents. If a bipolar transistor switch were used, substantial base current would be wasted during periods of high load currents. Thus, the present technique of implementing a MOSFET switch provides an important power savings for portable applications.

Switch control circuitry 22 includes resistor R6, resistor R12, capacitor Cl, capacitor C19, and silicon-controlled rectifier SCR2. These resistors couple control signals to the gate of transistor Q1. Capacitor Cl and capacitor C19 function as RF bypasses. SCR2 provides the mechanism to disable transistor Q1 in response to a current trip signal or a voltage trip signal.

Current sensor 18 is comprised solely of resistor 13 connected in series between input terminal 34 and the source terminal of transistor Q1. Under overload conditions, excessive load currents develop a voltage across R13. This voltage is monitored by current trip circuit 24, which, in turn, provides a disable signal to switch control 22.

Current trip circuitry 24 is comprised of: resistors R9, R10, and R15; capacitors C5, C6, and C21, hot carrier diode CR2, and temperature sensitive resistor (thermistor) RT2. This temperature compensated bias circuitry allows R13 to be a smaller value than if the SCR were directly fired by the voltage across R13. C5 and C21 function as RF bypasses. Capacitor C6 introduces a time delay at the gate of SCR2 to prevent current and/or voltage tripping during initial turn-on of the radio.

Current limiting is provided by zener diode CR4 coupled to the gate of transistor Q1. The voltage trip function is performed by resistor R17, which monitors the load voltage at terminal 38 to apply a voltage trip signal to SCR2.

Briefly, intrinsically safe battery circuit 30 operates as follows:

A. No-load Conditions

Under no-load conditions, transistor Q1 is off, output terminal 38 is at ground potential, and transistors Q3 and Q4 remain off. Thus, the only current drain from the battery is that of collector-emitter leakage currents of transistors Q3 and Q4. This feature of negligible current drain (i.e., less than 1 microamp) under no-load conditions can be a significant advantage in portable radio applications since the battery will not become discharged when the radio is not being used.

B. Turn-on

When an external load is connected (i.e., the radio is turned on), the voltage at terminal 38 rises to approximately battery potential. This voltage is applied to the junction of R4 and R5 providing base current for transistor Q4. Q4 then turns on and provides base current for transistor Q3 through resistor R2. Transistor Q3 turns on and applies its collector voltage to the gate of power switch transistor Q1 through series resistors R6 and R12. Now transistor Q1 conducts, reducing the voltage at terminal 38 to approximately 0.6 volts (with respect to ground). Transistor Q4 remains on as long as Q3 supplies supplementary base current through resistor R3 and as long as 0.6 volts remains at the drain terminal of Q1. Transistors Q1, Q4, and Q3 form a closed loop to maintain a constant 0.6 volts output at terminal 38. Capacitor C12 provides damping for the loop.

If the load current increases (i.e., under radio transmit conditions), the voltage across the drain to source of Q1 will increase. This slight increase in drain voltage will turn Q4 on harder, which will then turn Q3 on harder, such that a higher gate voltage is applied to Q1. Consequently, the drain-to-source impedance of transistor Q1 will decrease such that approximately 0.6 volts is maintained at terminal 38.

C. Turn-off

When the external load is disconnected, the voltage at output terminal 38 falls to zero. Consequently, transistor Q4 receives insufficient base current through resistor R4 to stay on. When Q4 turns off, Q3 then turns off which shuts down the voltage supply to the rest of the circuit. With zero gate voltage, transistor Q1 turns off and battery current drops to approximately zero.

D. Current Limiting

Zener diode CR4 coupled to the gate of transistor Q1 functions as a current limiter. As the load current increases, the closed loop combination of transistors Q1, Q3, and Q4 track this current increase and compensate by increasing the voltage at the gate of transistor Q1. If, however, the load current approaches a predetermined maximum level (i.e., 5 amps), then zener diode CR4 clamps the voltage at the junction of resistors R6 and R12 to a maximum gate voltage which corresponds to this maximum current level. Any load current demands beyond this maximum current level will not be met by an increase in gate voltage of Q1. As a result, zener diode CR4 sets a minimum drain-to-source resistance of MOSFET transistor Q1 which results in a maximum current level during overload conditions.

This method of monitoring the gate voltage of a MOSFET transistor provides continuous current limiting for the battery protection circuit. For a more precise current limit threshold, the zener diode's breakdown voltage may be selected to match the particular MOSFET's gate pinch-off voltage.

E. Current Tripping

In addition to current limiting, it is desirable to provide a current trip mechanism such that no current flows through a short circuit to protect against thermal heating. Current sensor 18 in combination with current trip circuit 24 provide this function. Current sensor 18 consists solely of series resistor R13 coupled in the load current return path. When excessive load current flows, a substantial voltage is developed across R13. Current trip circuit 24 monitors this series voltage drop and provides a disable signal to SCR2 of switch control circuit 22.

The gate of SCR2 is biased at about 0.3 volts with respect to the source terminal of transistor Q1 by the combination of resistor R9, R10, R15, thermistor RT2 and hot carrier diode CR2. Under normal load current conditions, diode CR2 holds the gate voltage of SCR2 at 0.3 volts, which is below its 0.5 volts firing threshold. If the external load current exceeds a predetermined level, then the voltage developed across R13 will increase until the SCR gate trigger level of 0.5 volts is reached, firing the SCR. When the SCR conducts, the gate voltage of Q1 is pulled low to approximately 1 volt. This turns Q1 off. Thus, the battery is effectively disconnected from the load. The battery circuit will stay in this disconnected state until the external load is completely removed. When the load is removed, transistors Q3 and Q4 will turn off to reduce the SCR anode-to-cathode current to zero. Thus, the battery protection circuit of the present invention resets itself when the external load is disconnected.

The SCR gate biasing arrangement of the present invention allows the value of current sensor resistor R13 to be minimized—a significant advantage in portable applications. If a typical SCR gate biasing arrangement were used, a current trip level of 2.0 amps, for example, would require R13 to be 0.25 ohms to develop the 0.5 volts required to fire SCR2. However, since the gate of SCR2 is nominally biased at 0.3 volts with respect to its cathode by hot carrier diode CR2, only 0.2 volts developed across R13 is required to fire the SCR. Using the same current trip level of 2.0 amps, R13 can now be reduced to 0.1 ohm. Therefore, the voltage drop in series with the external load is kept to a minimum. Thermistor RT2 is required for temperature compensation, since the hot carrier diode junction does not track the SCR gate junction over temperature. This SCR biasing technique provides the significant advantage of reducing the series voltage drop of the battery protection circuit.

F. Voltage Tripping

When the battery becomes discharged, the voltage applied to the gate of Q1 is correspondingly reduced. If this reduced gate voltage is insufficient to saturate Q1, then the transistor may dissipate a significant amount of power under high current conditions. To prevent overdissipation (and a possible explosion in a hazardous environment), voltage trip circuit 28 turns off Q1 before it is damaged due to excessive heating.

Resistor R17 senses an increase in voltage at the drain of Q1 to apply a voltage trip signal to the gate terminal of SCR2. When a sufficiently high drain voltage is reached, the SCR fires and turns Q1 off by clamping its gate voltage to approximately 1 volt. The SCR remains in a conductive state until the load is disconnected. Capacitor C6, connected to the gate of SCR2, provides the necessary time delay to prevent voltage or current tripping upon initial radio turn-on.

In summary, an intrinsically safe battery circuit has been described which limits the amount of current supplied by the battery to a load. The circuit is particularly well adapted for use in portable radio applications in which the equipment used must meet strict specifications of hazardous atmosphere environments. The battery protection circuit of the present invention provides the following advantages: negligible power consumption when not in use; minimized power consumption during use; continuous current limiting; overcurrent trip protection; switch device overdissipation protection; minimal series voltage drop; and inexpensive, compact circuit configuration.

While specific embodiments of the present invention have been shown and described herein, further modifications and improvements may be made by those skilled in the art. All such modifications which retain the basic underlying principles disclosed and claimed herein are within the scope of this invention.

What is claimed is:

1. An overload protection circuit for limiting the amount of power delivered from a power source to a load, said protection circuit comprising:
   input terminals;
   output terminals;
   power controlling means coupling said input terminals to said output terminals for controlling the amount of power delivered to said output terminals; and
   load sensing means for sensing the presence of a load at said output terminals and for directing said power controlling means to deliver power to said output terminals only when a load is present, said load sensing means preventing said power controlling means from consuming power from said input terminals except when a load is present.

2. The overload protection circuit as described in claim 1, wherein said load sensing means draws less than 1 microamp of current from said input terminals when a load is not present.

3. The overload protection circuit as described in claim 1, wherein said power controlling means includes current limiting means for continuously limiting the amount of current delivered from said input terminals to said output terminals to a predetermined value.

4. The overload protection circuit as described in claim 1, wherein said power controlling means further includes current tripping means for interrupting current flow from said input terminals to said output terminals when the load current exceeds a given value.

5. The overload protection circuit as described in claim 4, wherein said current tripping means includes current sensing means coupled in series between said input terminals and said output terminals for sensing the amount of load current.

6. The overload protection circuit as described in claim 5, wherein said current sensing means is a resistor.

7. The overload protection circuit as described in claim 4, wherein said current tripping means further includes a silicon-controlled rectifier (SCR).

8. The overload protection circuit as described in claim 7, wherein the SCR gate terminal is nominally biased at a higher voltage than the SCR cathode terminal when no current is flowing to said output terminals.

9. The overload protection circuit as described in claim 8, wherein the SCR gate biasing circuitry is temperature compensated.

10. The overload protection circuit as described in claim 1, wherein said power controlling means further includes power switching means coupled in series between said input terminals and said output terminals for switching power from said input terminals to said output terminals.

11. The overload protection circuit as described in claim 10, wherein said power switching means is a field-effect transistor (FET).

12. The overload protection circuit as described in claim 10, wherein said power controlling means further includes voltage tripping means for interrupting current flow from said input terminals to said output terminals when the series voltage drop across said power switching means exceeds a particular set level.

13. The method of protecting portable battery-operated equipment against sparking and thermal ignition in a hazardous atmosphere environment, comprising the steps of:
sensing when the portable equipment is switched on, thereby applying battery power to the portable equipment;
continuously limiting the current delivered by the battery to the portable equipment to a predetermined value;
interrupting the current delivered by the battery to the portable equipment if the current exceeds a predetermined value; and
sensing when the portable equipment is swiched off, thereby removing battery power from the portable equipment such that negligible current is drawn from the battery when the portable equipment is switched off.

* * * * *